US012528762B2

United States Patent
Epstein et al.

(10) Patent No.: US 12,528,762 B2
(45) Date of Patent: Jan. 20, 2026

(54) CATALYST COMPOSITION FOR POLYOLEFIN POLYMERS

(71) Applicant: W.R. Grace & Co.-CONN., Columbia, MD (US)

(72) Inventors: Ronald Epstein, Columbia, MD (US); Michael Miller, Columbia, MD (US); Michael Elder, Columbia, MD (US); Vladimir Marin, Columbia, MD (US); Ahmed Hintolay, Columbia, MD (US); Timothy Boyer, Columbia, MD (US)

(73) Assignee: W.R. Grace & Co.-CONN, Columbia, MD (US)

( * ) Notice: Subject to any disclaimer, the term of this patent is extended or adjusted under 35 U.S.C. 154(b) by 598 days.

(21) Appl. No.: 17/761,555

(22) PCT Filed: Sep. 16, 2020

(86) PCT No.: PCT/US2020/051011
§ 371 (c)(1),
(2) Date: Mar. 17, 2022

(87) PCT Pub. No.: WO2021/055430
PCT Pub. Date: Mar. 25, 2021

(65) Prior Publication Data
US 2022/0220060 A1    Jul. 14, 2022

Related U.S. Application Data

(60) Provisional application No. 62/902,118, filed on Sep. 18, 2019.

(51) Int. Cl.
*C08F 110/06* (2006.01)
*C07C 69/78* (2006.01)
*C08F 210/06* (2006.01)

(52) U.S. Cl.
CPC ............ *C07C 69/78* (2013.01); *C08F 110/06* (2013.01); *C08F 2420/00* (2013.01)

(58) Field of Classification Search
CPC .............................. C08F 110/06; C08F 210/06
See application file for complete search history.

(56) References Cited

U.S. PATENT DOCUMENTS 4,978,648 A * 12/1990 Barbe ..................... C08F 10/00
502/134
5,322,830 A * 6/1994 Sormunen ............... C08F 10/00
526/124.8

(Continued)

FOREIGN PATENT DOCUMENTS

| JP | 2001-019707 A | 1/2001 |
| JP | 2002-167405 A | 6/2002 |

(Continued)

OTHER PUBLICATIONS

EESR on EP patent application No. 20864653.9 dated Sep. 12, 2023 (10 pages).

(Continued)

*Primary Examiner* — Catherine S Branch
(74) *Attorney, Agent, or Firm* — Dority & Manning, P.A.

(57) ABSTRACT

A Ziegler-Natta catalyst composition is disclosed. The catalyst composition is formed from a procatalyst containing a magnesium moiety and a titanium moiety. At least one internal electron donor is incorporated into the procatalyst. During a titanation procedure in conjunction with the internal electron donor, a titanium extractant is used to remove or deactivate low activity or atactic titanium active sites.

20 Claims, 1 Drawing Sheet

IR spectrum of catalyst from example E21 (range of 1500-1800 cm-1)

(56) References Cited

U.S. PATENT DOCUMENTS

| | | |
|---|---|---|
| 8,211,819 B2 | 7/2012 | Chang |
| 9,796,796 B2 | 10/2017 | Chen et al. |
| 2010/0029870 A1 | 2/2010 | Chang |
| 2013/0225398 A1 | 8/2013 | Chen et al. |
| 2013/0261273 A1* | 10/2013 | Chen .................. C08F 4/16 |
| | | 526/194 |
| 2019/0270831 A1 | 9/2019 | Nguyen et al. |

FOREIGN PATENT DOCUMENTS

| | | |
|---|---|---|
| JP | 2006-521451 A | 9/2006 |
| JP | 2012-046593 A | 3/2012 |
| JP | 2012-514125 A | 6/2012 |
| JP | 2012-514126 A | 6/2012 |
| WO | WO-2010/078494 A2 | 7/2010 |
| WO | WO 2013/077837 A1 | 5/2013 |
| WO | WO 2014/132806 A1 | 9/2014 |
| WO | WO-2018/060406 A1 | 4/2018 |
| WO | WO2018/067367 A1 | 4/2018 |
| WO | WO-2019/094216 A1 | 5/2019 |

OTHER PUBLICATIONS

IPRP on non-Foley case related to PCT patent application No. PCT/US2020/051011 dated Mar. 31, 2022 (6 pages).
International Search Report and Written Opinion issued in International Patent Application No. PCT/US2020/051011, dated Dec. 17, 2020.
Office Action from JP 2022-517350, Mailed on Oct. 28, 2024, 6 pages.

* cited by examiner

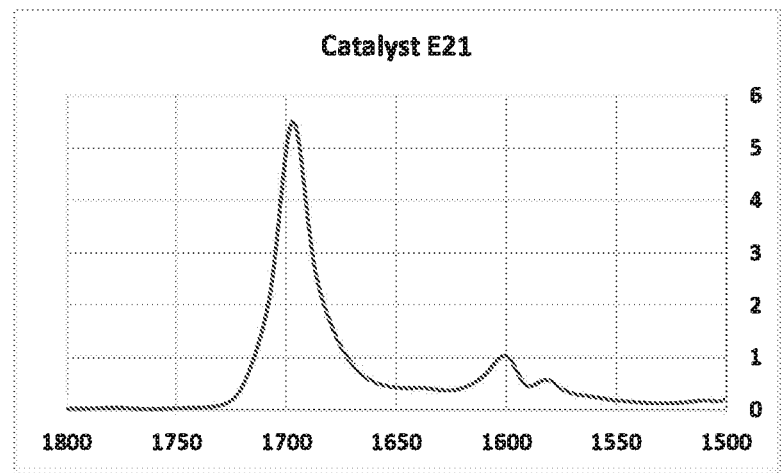
Figure 1. IR spectrum of catalyst from example E21 (range of 1500-1800 cm-1)
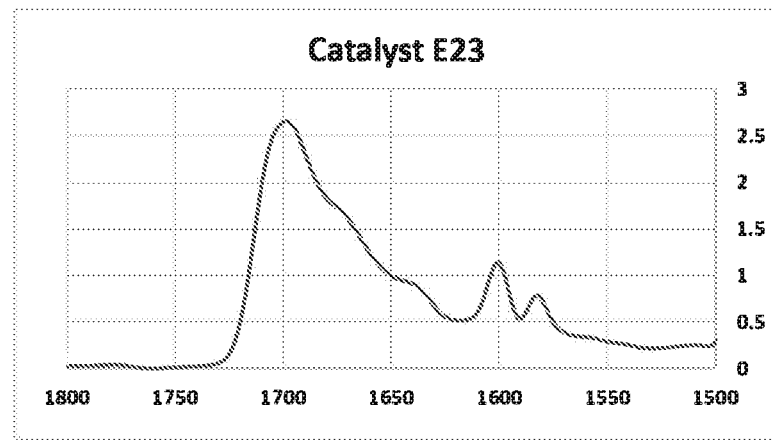
Figure 2. IR spectrum of catalyst from example E23 (range of 1500-1800 cm-1)

CATALYST COMPOSITION FOR POLYOLEFIN POLYMERS

RELATED APPLICATIONS

The present application is the U.S. National Stage of International Patent Application No. PCT/US2020/051011, filed Sep. 16, 2020, which claims priority to U.S. Provisional Patent application Ser. No. 62/902,118, filed Sep. 18, 2019, both of which are incorporated herein by reference.

BACKGROUND

Polyolefin polymers are used in numerous and diverse applications and fields. Polyolefin polymers, for instance, are thermoplastic polymers that can be easily processed. The polyolefin polymers can also be recycled and reused. Polyolefin polymers are formed from hydrocarbons, such as ethylene and alpha-olefins, which are obtained from petrochemicals and are abundantly available.

Polypropylene polymers, which are one type of polyolefin polymers, generally have a linear structure based on a propylene monomer. Polypropylene polymers can have various different stereospecific configurations. Polypropylene polymers, for example, can be isotactic, syndiotactic, and atactic. Isotactic polypropylene is perhaps the most common form and can be highly crystalline. Polypropylene polymers that can be produced include homopolymers, modified polypropylene polymers, and polypropylene copolymers which include polypropylene terpolymers. By modifying the polypropylene or copolymerizing the propylene with other monomers, various different polymers can be produced having desired properties for a particular application. For example, polypropylene copolymers can be produced having elastomeric properties which greatly enhances the impact strength of the polymers.

Worldwide demand for olefin-based polymers continues to grow as applications for these polymers become more diverse and more sophisticated. Known are Ziegler-Natta catalyst compositions for the production of olefin-based polymers. Ziegler-Natta catalyst compositions typically include a procatalyst containing a transition metal halide (i.e., titanium, chromium, vanadium), and a cocatalyst such as an organoaluminum compound.

Ziegler-Natta catalyst compositions are made using an organic electron donor. The electron donors are typically referred to as internal electron donors to show that they are bound to the procatalyst and to distinguish them from other electron donors used during the polymerization process, which are typically referred to as external electron donors. The internal electron donors can determine to a large extent the performance properties of the overall catalyst composition, such as the catalyst activity. The internal electron donors can also influence the properties of polymers made from the catalyst composition. For instance, internal electron donors can influence polymer melt flow rates, xylene soluble content, and the like.

In addition to the internal electron donors incorporated into the procatalyst, the manner in which the procatalyst is produced can also influence a range of performance characteristics. For example, varying the stoichiometries of raw materials used to produce the procatalyst and the conditions and number of steps used during the synthesis can affect various properties of the catalyst composition and properties of the polymers produced.

Recently, great efforts have been undertaken to improve catalyst composition performance through the use of internal electron donors having relatively complex structures. Although great advances have occurred in the art, various improvements are still needed. A need exists, for instance, for a catalyst composition capable of producing polyolefin polymers over a broad range of xylene solubles content, e.g. polymers with relatively high xylene solubles content and polymers with relatively low xylene solubles content. In addition to the above, a need also exists for a process for producing catalyst compositions that can not only improve the properties of the catalyst composition but can also minimize the amount of internal electron donors needed to produce the catalyst composition.

SUMMARY

In general, the present disclosure is directed to a catalyst system for producing polyolefin polymers. The present disclosure is also directed to an improved catalyst composition and to a process for producing the catalyst composition. The catalyst composition of the present disclosure can have numerous benefits and can be designed and formulated for a particular application. For example, Ziegler-Natta catalyst compositions made according to the present disclosure can have increased stereoselectivity and/or can produce polyolefin polymers over an extremely broad range of xylene solubles content. Thus, the catalyst compositions of the present disclosure are well suited for use in many different types of polymerization processes for producing a wide range of different polyolefin products. The catalyst composition can produce polymers, such as propylene polymers, having a reduced amorphous or atactic phase and can have a reduced xylene soluble content. Of particular advantage, catalyst compositions can be made according to the present disclosure having the above benefits while also requiring less amounts of internal electron donors to produce the catalyst composition.

In one embodiment, for instance, the present disclosure is directed to a process for producing a Ziegler-Natta catalyst composition. The process includes forming a procatalyst support from a magnesium moiety and a titanium moiety.

The magnesium moiety, for instance, can have the following formula:

$$Mg(OR)_nX_{2-n}L_m$$

wherein R comprises an alkyl or aryl group containing a halogen atom; n is 0 to 2; L comprises coordinated ligand groups of ethers and/or alcohols; m is the number of coordinated ligands and is from 0 to 10. The titanium moiety can have the following formula:

$$Ti(OR)_gX_{4-g}$$

wherein each R is independently a $C_1$-$C_4$ alkyl group; X is bromine, chlorine or iodine; and g is 0, 1, 2 or 3.

The procatalyst is subjected to at least a first titanation step and a second titanation step. An internal electron donor, such as an aryl diester, can be incorporated into the procatalyst. In accordance with the present disclosure, the procatalyst is contacted with a titanium extractant during at least one titanation step or after the titanation steps. The titanium extractant removes titanium on the procatalyst. More particularly, it is believed that the titanium extractant can extract or deactivate titanium species on the procatalyst that are lower in activity or atactic sites that do not bind to the internal electron donor, thereby improving the stereoselectivity of the catalyst.

The titanium extractant is an organic compound that can be less sterically bulky than the internal donor employed in the procatalyst preparation and the titanium extractant is able to access titanium sites not accessible by the sterically bulky internal donor. The titanium extractant shows an affinity for titanium less than or equal to that of the internal donor employed in the procatalyst preparation. The titanium extractant may remain in the procatalyst to a small extent. Examples of titanium extractants include esters, ketones, carbonates, and mixtures thereof. In one aspect, the titanium extractant is a monoester. For example, the titanium extractant may be an alkyl benzoate, such as ethyl benzoate.

The internal electron donor can also vary depending upon the particular application. In one aspect, the internal electron donor is an aryl diester. The internal electron donor can have the following formula:

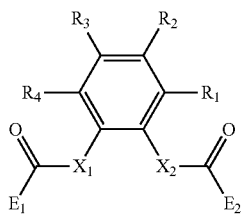

wherein $R_1$ and $R_4$ are each hydrogen or a hydrocarbyl group having from 1 to 20 carbon atoms, and wherein at least one of $R_2$ and $R_3$ is hydrogen, and wherein at least one of $R_2$ and $R_3$ comprises a substituted or unsubstituted hydrocarbyl group having from 1 to 20 carbon atoms, and where $E_1$ and $E_2$ are the same or different and selected from the group consisting of an alkyl having 1 to 20 carbon atoms, a substituted alkyl having 1 to 20 carbon atoms, an aryl having 6 to 20 carbon atoms, a substituted aryl having 6 to 20 carbon atoms, or an inert functional group having 1 to 20 carbon atoms and optionally containing heteroatoms, and wherein $X_1$ and $X_2$ are each O, S, an alkyl group or $NR_5$ and wherein $R_5$ is a hydrocarbyl group having 1 to 20 carbon atoms or is hydrogen.

Alternatively, the internal electron donor may be a naphthyl dibenzoate, such as a 1,8-naphthyl diaryloate compound, as follows:

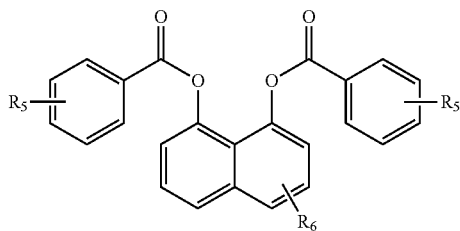

wherein each R is independently hydrogen, halogen, alkyl having 1 to about 8 carbon atoms, phenyl, arylalkyl having 7 to about 18 carbon atoms, or alkylaryl having 7 to about 18 carbon atoms. In another embodiment, each R is independently hydrogen, alkyl having 1 to about 6 carbon atoms, phenyl, arylalkyl having 7 to about 12 carbon atoms, or alkylaryl having 7 to about 12 carbon atoms.

General examples include 1,8-naphthyl di(alkylbenzoates); 1,8-naphthyl di(dialkylbenzoates); 1,8-naphthyl di(trialkylbenzoates); 1,8-naphthyl di(arylbenzoates); 1,8-naphthyl di(halobenzoates); 1,8-naphthyl di(dihalobenzoates); 1,8-naphthyl di(alkylhalobenzoates); and the like.

As described above, the titanium extractant can contact the procatalyst during a titanation step. For example, the titanium extractant can contact the procatalyst during a first titanation step, during a second titanation step, during a third titanation step, or any combination thereof. For example, the procatalyst can be contacted with the titanium extractant only during the second titanation step. The procatalyst can be contacted with the titanium extractant alone or in conjunction with an internal electron donor. For example, the procatalyst can be contacted with the internal electron donor in the absence of the titanium extractant during the first titanation step and, during the second titanation step, can be contacted with the titanium extractant in the absence of the internal electron donor. In another alternative, the procatalyst is contacted with the internal electron donor and the titanium extractant during the first titanation step and, during the second titanation step, is contacted with the internal electron donor, the titanium extractant, or both the internal electron donor and the titanium extractant.

The procatalyst can contain a magnesium halide and a titanium compound. In one aspect, the procatalyst is a spray crystallized magnesium halide compound.

The present disclosure is also directed to a process for producing a polyolefin polymer. The process includes polymerizing a propylene monomer and optionally one or more comonomers in the presence of a catalyst composition. The catalyst composition can comprise a procatalyst that has been subjected to at least a first titanation step and a second titanation step. In accordance with the present disclosure, the procatalyst has been contacted with a titanium extractant during at least one of the titanation steps or after the titanation steps.

The process for producing a polyolefin polymer as described above can produce polypropylene polymers having a broad range of xylene solubles content. For example, the xylene solubles content can be anywhere from about 0.25% by weight to about 10% by weight. In this manner, the catalyst composition of the present disclosure is well suited to producing all different types of polyolefin polymers. In one embodiment, for instance, a polypropylene polymer can be produced having a relatively low xylene solubles content, such as less than about 4% by weight. In other embodiments, however, polypropylene polymers can be produced having a higher xylene solubles content.

When used to produce polyolefin polymers, the catalyst composition may include a cocatalyst. The cocatalyst may comprise a hydrocarbon aluminum compound, such as triethylaluminum. The composition may also contain a selectivity control agent. The selectivity control agent may comprise an alkoxy silane. For example, the selectivity control agent may comprise dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, dimethyldimethoxysilane or mixtures thereof.

In still another embodiment, the catalyst composition may include an activity limiting agent.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIG. 1 is a graphical representation of the results obtained in the examples below, and FIG. 2 is another graphical representation of the results obtained in the examples below.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to catalyst systems for producing polyolefin polymers, particularly polypropylene polymers. The present disclosure is also directed to a catalyst composition and to methods of polymerizing and copolymerizing olefins using the catalyst composition. In general, the catalyst composition of the present disclosure includes a procatalyst containing a magnesium moiety, optionally a titanium moiety, and an internal electron donor. In accordance with the present disclosure, the procatalyst is produced using a titanium extractant. The titanium extractant extracts or deactivates titanium species that are lower in activity and worse in stereoregulating ability than other titanium species present on the procatalyst. Removing less desirable titanium species using the titanium extractant produces a Ziegler-Natta catalyst composition having increased stereoselectivity and improved XS capability.

The catalyst composition as described above can produce polymers having a desired combination of properties. For example, the catalyst composition of the present disclosure can be used to produce polyolefin polymers over a very broad range of xylene solubles content. Consequently, one catalyst can be used to produce polymers having a low xylene solubles content and polymers having a relatively high xylene solubles content. Consequently, catalyst producers can produce polymers having a very broad range of properties without having to undergo a catalyst transition during a change from one polymer grade to another polymer grade. For example, polyolefin polymers, such as polypropylene polymers, produced with a single catalyst made in accordance with the present disclosure can range in xylene solubles content from 1.5% to 6%.

In one aspect, the procatalyst composition can also be produced consuming less internal electron donor in the titanation process(es). For instance, in one aspect, the titanium extractant can remove or displace titanium that cannot easily be displaced by the more expensive internal electron donor. Further, less internal electron donor can be used to produce the procatalyst while still incorporating the same amount of internal electron donor into the procatalyst as would occur if the titanium extractant were not used.

The synthesis of procatalyst compositions in accordance with the present disclosure generally involve two or more titanation reactions or steps. For example, the procatalyst composition can be produced using two, three or four titanation steps. In accordance with the present disclosure, as will be described in greater detail below, the titanium extractant of the present disclosure can contact the procatalyst during the synthesis of the procatalyst composition during any or all of the titanation steps. The titanium extractant can also contact the procatalyst after the titanation steps have occurred. During the titanation steps, the titanium extractant can contact the procatalyst either alone or in conjunction with an internal electron donor.

The procatalyst that is used to produce the catalyst composition of the present disclosure can vary depending upon the particular embodiment and the desired result. In general, the procatalyst support contains a magnesium moiety and a titanium moiety. The magnesium moiety, for instance, can generally have the following formula:

$$Mg(OR)_nX_{2-n}L_m$$

wherein R comprises an alkyl or aryl group containing a halogen atom; n is 0 to 2; L comprises coordinated ligand groups of ethers and/or alcohols; m is the number of coordinated ligands and is from 0 to 10. The titanium moiety can generally have the following formula:

$$Ti(OR)_gX_{4-g}$$

wherein each R is independently a C1-C4 alkyl group; X is bromine, chlorine or iodine; and g is 0, 1, 2 or 3.

The procatalyst support, for example, can be a mixed magnesium titanium compound (MagTi), or a benzoate-containing magnesium chloride compound (BenMag).

In one aspect, the procatalyst support is a mixed magnesium/titanium compound ("MagTi"). The "MagTi precursor" has the formula $Mg_dTi(OR^e)_fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3. The precursors are prepared by controlled precipitation through removal of an alcohol from the reaction mixture used in their preparation. The reaction medium can comprise a mixture of an aromatic liquid, especially a chlorinated aromatic compound, most especially chlorobenzene, with an alkanol, especially ethanol. Suitable halogenating agents include titanium tetrabromide, titanium tetrachloride or titanium trichloride, especially titanium tetrachloride. Removal of the alkanol from the solution used in the halogenation, results in precipitation of the solid precursor, having especially desirable morphology and surface area. Moreover, the resulting precursors are particularly uniform in particle size.

Alternatively, the procatalyst support is a benzoate-containing magnesium chloride material ("BenMag"). As used herein, a "benzoate-containing magnesium chloride" ("BenMag") can be a procatalyst (i.e., a halogenated procatalyst support) containing a benzoate internal electron donor. The BenMag material may also include a titanium moiety, such as a titanium halide. The benzoate internal donor is labile and can be replaced by other electron donors during catalyst and/or procatalyst synthesis. Nonlimiting examples of suitable benzoate groups include ethyl benzoate, methyl benzoate, ethyl p-methoxybenzoate, methyl p-ethoxybenzoate, ethyl p-ethoxybenzoate, ethyl p-chlorobenzoate. In one embodiment, the benzoate group is ethyl benzoate. In an embodiment, the BenMag procatalyst support may be a product of halogenation of any procatalyst support (i.e., a MagMo precursor or a MagTi precursor) in the presence of a benzoate compound.

In one embodiment, a substantially spherical $MgCl_2$-nEtOH adduct may be formed by a spray crystallization process. In the process, a $MgCl_2$-nROH melt, where n is 1-6, is sprayed inside a vessel while conducting inert gas at a temperature of 20-80° C. into the upper part of the vessel. The melt droplets are transferred to a crystallization area into which inert gas is introduced at a temperature of −50 to 20° C. crystallizing the melt droplets into nonagglomerated, solid particles of spherical shape. The spherical $MgCl_2$ particles are then classified into the desired size. Particles of undesired size can be recycled. The spherical $MgCl_2$ precursor can have an average particle size (Malvern $d_{50}$) of between about 15-150 microns, preferably between 20-100 microns, and most preferably between 35-85 microns.

The above spherical procatalyst support is referred to as a "spray crystallized" procatalyst precursor. In one embodiment, the spray crystallized precursor can be dealcoholated. For instance, the spray crystallized treatment can undergo a post-treatment process in order to remove ethanol. For example, the ethanol/magnesium chloride weight ratio can be less than about 6:1, such as from about 1.5:1 to about 3.1:1, such as from about 2:1 to about 2.5:1.

In accordance with the present disclosure, one of the procatalyst supports described above are subjected to a plurality of titanation steps in forming a procatalyst that can then be later activated by contact with a cocatalyst. During titanation, the procatalyst is contacted with a titanium halogenating agent which can convert the magnesium moiety into a magnesium halide and/or can convert the titanium moiety into a titanium halide.

In one aspect, the titanium halide has the formula $Ti(OR^e)_f X_h$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms and wherein each $OR^e$ group is the same or different; X is independently chlorine, bromine, or iodine; f is an integer from 0 to 3; h is an integer from 1 to 4; and f+h is 4. The halogenating agent can be $TiCl_4$. Titanation can be conducted in the presence of a chlorinated or a non-chlorinated aromatic liquid, such as dichlorobenzene, o-chlorotoluene, chlorobenzene, benzene, toluene, or xylene. For example, titanation can be conducted using a mixture of a titanium halide and a chlorinated aromatic liquid comprising from 40 to 60 volume percent titanium halide, such as $TiCl_4$.

The procatalyst and titanium halide can be contacted initially at a temperature of less than about 10° C., such as less than about 0° C., such as less than about −10° C., such as less than about −20° C., such as less than about −30° C. The initial temperature is generally greater than about −50° C., such as greater than about −40° C. The mixture is then heated at a rate of 0.1 to 10.0° C./minute, or at a rate of 1.0 to 5.0° C./minute. Temperatures for the titanation are from 40° C. to 150° C. (or any value or subrange therebetween), or from 0° C. to 120° C.

The titanation procedure may be repeated one, two, three, four or more times as desired. In the past, internal electron donors were incorporated into the procatalyst by being present during the titanation steps. In fact, when incorporating internal electron donors like aryl diesters into the procatalyst, it was believed to be necessary to have the internal electron donor present in many if not all of the titanation steps in order to produce a catalyst composition with high activity necessary for polymerizations and for producing polymers with low xylene solubles. The above internal electron donors, however, are relatively expensive and through the above process were inefficiently incorporated into the procatalyst. Although unknown, it is believed that the procatalyst contains titanium species that are lower in activity and bonded to sites not readily available to bind with the internal electron donor. Thus, the present disclosure is directed to using a titanium extractant during the process for removing the lower activity titanium without interfering with incorporation of the internal electron donor into the procatalyst. In fact, in one aspect, the process of the present disclosure can more efficiently incorporate the internal electron donor into the procatalyst thereby using less internal electron donor and improving the economics of the synthesis process.

In accordance with the present disclosure, the procatalyst is contacted with at least one internal electron donor and a titanium extractant during the titanation steps and/or after the titanation steps. The manner in which the procatalyst, the titanium halide, the internal electron donor, and the titanium extractant are contacted can be varied depending upon the particular application and the desired result. In one embodiment, for instance, the procatalyst can be contacted with an internal electron donor in combination with a titanium halide during one or more titanation steps while in other titanation steps, the procatalyst can be contacted with the titanium extractant and the titanium halide. Alternatively, the internal electron donor and the titanium extractant can contact the procatalyst together in conjunction with the titanium halide during any or all of the titanation steps. In still other embodiments, the procatalyst can be contacted with the internal electron donor during certain titanation steps, can be contacted with the titanium extractant during other titanation steps, and can be contacted with both the internal electron donor and the titanium extractant during further titanation steps.

For example, in one aspect, the procatalyst is only contacted with an internal electron donor in the presence of a titanium halide during the first titanation step and is only contacted with a titanium extractant in combination with a titanium halide in the second titanation step. In an alternative process, the procatalyst is contacted with an internal electron donor and a titanium extractant in the first titanation step and contacted with the titanium extractant only in the second titanation step, contacted with the internal electron donor only in the second titanation step, or contacted with both the internal electron donor and the titanium extractant during the second titanation step.

It should be appreciated that various other variations of the process can occur in order to produce a catalyst composition with the desired amount of catalyst activity and with the desired level of stereoselectivity. For instance, the process can be carried out such that the procatalyst is contacted with a titanium extractant in the absence of an internal electron donor in at least one of the titanation steps. The process can also be carried out such that the procatalyst is contacted with both an internal electron donor and a titanium extractant during at least one of the titanation steps.

The manner in which the procatalyst, the titanium halide, the internal electron donor, and the titanium extractant are contacted can also be varied. For example, in one embodiment, the procatalyst can first be contacted with the titanium halide and optionally an aromatic compound, such as a chlorinated aromatic compound. The resulting mixture can be stirred and may be heated if desired. Next, an internal electron donor and/or a titanium extractant can be added to the reaction mixture for producing a solid procatalyst component.

Alternatively, the procatalyst can be contacted with the internal electron donor and/or the titanium extractant prior to reacting with the titanium halide.

In still another embodiment, the procatalyst can be contacted with the titanium halide, the internal electron donor and/or the titanium extractant simultaneously during one of the titanation steps.

Contact times between the procatalyst and the internal electron donor and/or titanium extractant can also vary. In general, the contact time between the procatalyst and the other components is at least 10 mins., such as at least 15 mins., such as at least 20 mins., such as at least 40 mins., such as at least 1 hour at a temperature of at least about −40° C., such as at least about −30° C., such as at least about −20° C., and generally less than about 150° C., such as less than about 120° C., such as less than about 110° C., such as less than about 100° C., such as less than about 80° C., such as less than about 50° C.

After the multiple titanation steps, a solid procatalyst component is produced.

After the foregoing titanation procedure, the resulting solid procatalyst composition is separated from the reaction medium employed in the final process, by filtering for example, to produce a moist filter cake. The moist filter cake may then be rinsed or washed with a liquid diluent to remove unreacted titanium halide and may be dried to remove residual liquid, if desired. Typically the resultant solid procatalyst composition is washed one or more times with a "wash liquid," which is a liquid hydrocarbon such as an aliphatic hydrocarbon such as isopentane, isooctane, isohexane, hexane, pentane, or octane. The solid procatalyst composition then can be separated and dried or slurried in a hydrocarbon, especially a relatively heavy hydrocarbon such as mineral oil for further storage or use.

After the solid procatalyst is recovered, the procatalyst composition may optionally be contacted with further quantities of a titanium halide compound. After the titanation steps, the solid procatalyst, for instance, can be contacted also with one or more internal electron donors and/or one or more titanium extractants. For example, the solid procatalyst can be contacted with further amounts of an internal electron donor followed by further amounts of a titanium extractant. In post-titanation processes, the procatalyst can also be simultaneously contacted with various other liquid components, such as an acid chloride. The procatalyst composition can be rinsed, washed, heat treated, or the like.

In one embodiment, the solid procatalyst composition, after the titanation steps, can be contacted with an internal electron donor and/or a titanium extractant while being heated and at an elevated temperature. The temperature, for instance, can be greater than about 100° C., such as greater than about 110° C., and generally less than about 170° C., such as less than about 150° C., such as less than about 130° C.

Through the above process, the internal electron donor and the titanium extractant work in conjunction to produce a procatalyst composition having increased stereoselectivity. In addition, in one embodiment, the resulting catalyst composition can also have increased or prolonged catalyst activity. The titanium extractant removes or displaces titanium species lower in activity that can adversely affect the stereoregulating ability of the catalyst composition during polymerization. In addition, the titanium extractant has been found not to displace the internal electron donor to any great extent and, in one embodiment, can actually improve the efficiency of incorporating the internal electron donor into the procatalyst composition.

During the process of producing the procatalyst, the titanium extractant removes less desirable titanium species and itself is not incorporated into the procatalyst composition to any great extent. For example, the resulting procatalyst composition contains the titanium extractant generally in an amount less than about 7% by weight, such as in an amount less than about 4% by weight, such as in an amount less than about 3% by weight, such as in an amount less than about 2% by weight, such as in an amount less than about 1% by weight. In one aspect, the titanium extractant is incorporated into the procatalyst in an amount less than the internal electron donor(s) on a weight percent basis. The titanium extractant removes significant amounts of titanium from the procatalyst. For instance, during the process, the titanium extractant is capable of removing greater than about 10% by weight, such as greater than about 15% by weight, such as greater than about 20% by weight, such as greater than about 25% by weight, such as greater than about 30% by weight, such as greater than about 35% by weight, such as greater than about 40% by weight, such as greater than about 45% by weight, such as greater than about 50% by weight of the titanium that is present. In general, titanium loss is less than about 70% by weight, such as less than about 50% by weight, such as less than about 45% by weight.

The weight ratio of titanium to magnesium in the solid procatalyst composition is suitably between about 1:3 and about 1:160, or between about 1:4 and about 1:50, or between about 1:6 and 1:30. In an embodiment, the internal electron donor may be present in the procatalyst composition in a molar ratio of internal electron donor to magnesium of from about 0.005:1 to about 1:1, or from about 0.01:1 to about 0.4:1. Weight percent is based on the total weight of the procatalyst composition.

In general, the titanium extractant can be a compound that is less bulky and generally smaller than the internal electron donor. Titanium extractants that may be used include, for instance, esters, ketones, carbonates, and mixtures thereof. In one embodiment, the titanium extractant can be a monoester. For example, the titanium extractant can have the following formula:

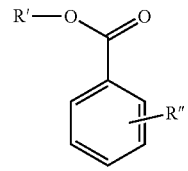

wherein R' comprises an alkyl group, a cyclic group, an aryl group having from 1 to 20 carbon atoms, a heteroatom or a combination thereof, and wherein R" comprises hydrogen or one or more substituted groups, each substituted group can comprise independently an alkyl group, a cyclic group, an aryl group having from 1 to 20 carbon atoms, a heteroatom, or a combination thereof. For example, in one embodiment, the supportive electron donor comprises ethylbenzoate.

Other monoesters that may be used as the titanium extractant include carboxylic acid esters. Such esters can include, for instance, methyl benzoate, ethyl benzoate, phenyl benzoate, ethyl anisate, benzyl acetate, ethyl acetate, octyl acetate, ethyl proprionate, ethyl butyrate, methyl butyrate, methyl laurate, methyl valerate, pentyl valerate, ethyl hexanoate, and mixtures thereof. Ketones that can be used include methyl ethyl ketone, methyl isobutyl ketone, acetophenone, benzophenone, acetone, diethyl ketone, ethyl phenyl ketone, butyl phenyl ketone, 3-hexanone, and mixtures thereof. Carbonates that can be used include dimethyl carbonate, diethyl carbonate, ethyl methyl carbonate, ethylene carbonate, and mixtures thereof.

Internal electron donors that can be used with the process of the present disclosure include internal electron donors that are preferentially bonded to active sites on the procatalyst in comparison to the titanium extractant. The internal electron donor, for instance, can be an aryl diester, an amidophenol dibenzoate, a mercaptophenol dibenzoate, a naphthyl dibenzoate, and the like.

As used herein, an internal electron donor is a compound added during formation of the catalyst composition that donates a pair of electrons to one or more metals present in the resultant composition. It is believed that the internal electron donor assists in regulating the formation of active sites and thus enhances catalyst stereoselectivity. In one embodiment, the internal electron donor of the present disclosure has the following chemical formula:

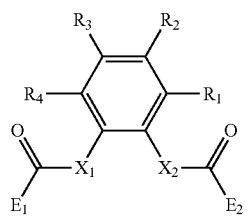

Formula I wherein $R_1$ and $R_4$ are each hydrogen or a hydrocarbyl group having from 1 to 20 carbon atoms, and wherein at least one of $R_2$ and $R_3$ is hydrogen, and wherein at least one of $R_2$ and $R_3$ comprises a substituted or unsubstituted hydrocarbyl group having from 1 to 20 carbon atoms, and where $E_1$ and $E_2$ are the same or different and selected from the group consisting of an alkyl having 1 to 20 carbon atoms, including cycloalkyl groups having 5 to 10 carbon atoms), a substituted alkyl having 1 to 20 carbon atoms, an aryl having 6 to 20 carbon atoms, a substituted aryl having 6 to 20 carbon atoms, or an inert functional group having 1 to 20 carbon atoms and optionally containing heteroatoms, and wherein $X_1$ and $X_2$ are each O, S, an alkyl group or $NR_5$ and wherein $R_5$ is a hydrocarbyl group having 1 to 20 carbon atoms or is hydrogen.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups 13, 14, 15, 16 or 17 of the Periodic Table. Nonlimiting examples of heteroatoms include: halogens (F, Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atom(s) may or may not be in the carbon chain.

The internal electron donor as shown above with respect to Formula I includes R1 through R4 groups that can be varied. R1 and R4 can be identical or very similar. In one embodiment, for instance, R1 and R4 are linear hydrocarbyl groups. For instance, R1 and R4 may comprise a C1 to C8 alkyl group, a C2 to C8 alkenyl group, or mixtures thereof. For example, in one embodiment, R1 and R4 may both comprise alkyl groups that have the same carbon chain length or vary in carbon chain length by no more than about 3 carbons atoms, such as by no more than about 2 carbon atoms.

In one embodiment, R4 is a methyl group, while R1 is a methyl group, an ethyl group, a propyl group, or a butyl group, or vice versa. In another alternative embodiment, both R1 and R4 are methyl groups, both R1 and R4 are ethyl groups, both R1 and R4 are propyl groups, or both R1 and R4 are butyl groups.

At least one of R2 or R3 is a substituted group that is larger or bulkier than the R1 and R4 groups. The other of R2 or R3 is hydrogen or a methyl group. The larger or bulky group situated at R2 or R3, for instance, can be a hydrocarbyl group having a branched or linear structure or may comprise a cycloalkyl group having from 5 to 15 carbon atoms. When either R2 or R3 has a branched or linear structure, on the other hand, R2 or R3 may be a pentyl group, a hexyl group, a heptyl group, an octyl group, a nonyl group, a decyl group, or the like. For instance, R2 or R3 may be a 3-pentyl group or a 2-pentyl group.

Further examples of internal electron donors are shown below. In each of the below structures, R1 through R4 can be substituted with any of the groups in any of the combinations described above.

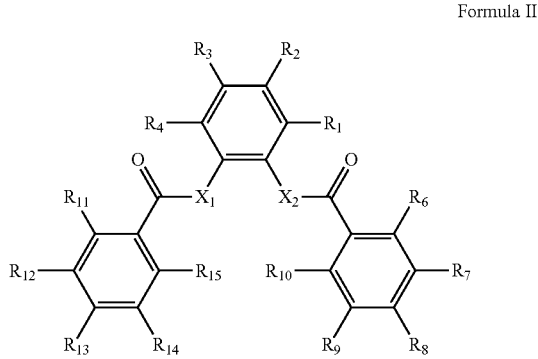

Formula II wherein R6 through R15 can be the same or different. Each of R6 through R15 is selected from a hydrogen, substituted hydrocarbyl groups having 1 to 20 carbon atoms, and unsubstituted hydrocarbyl groups having 1 to 20 carbon atoms, an alkoxyl group having 1 to 20 carbon atoms, a hetero atom, and combinations thereof.

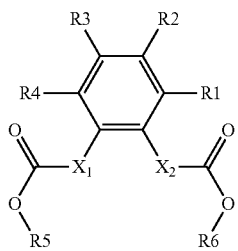

Formula III wherein X1 and X2 above can be oxygen, sulfur or a nitrogen containing group. In one embodiment, for instance, X1 is oxygen and X2 is sulfur. R5 and R6 can comprise independent alkyl groups or aryl groups. R5 and R6, for example, can comprise $C_1$ to $C_8$ alkyl groups.

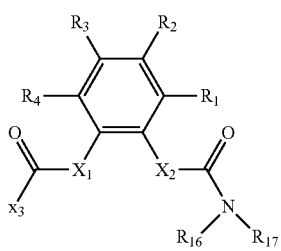

Formula IV wherein R16 and R17 are independently hydrogen or a C1 to C20 hydrocarbyl group. In the above formula, X1 and X2 can be oxygen, sulfur, or a nitrogen group. Alternatively, one or both of X1 and X2 maybe a hydrocarbyl group, such as an alkyl group containing 1 to 3 carbon atoms. X3 is a —OR group or a —NR1R2 group in which R, R1 or R2 are selected from a C1 to C20 hydrocarbyl group optionally containing a heteroatom selected from a halogen, phosphorous, sulfur, nitrogen, or oxygen. In one embodiment, X1 is a carbon atom and X3 is an ethyl group.

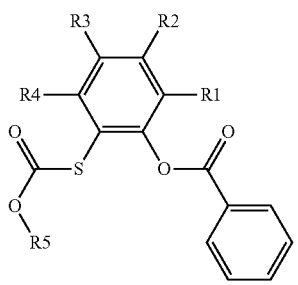

Formula V wherein R5 can be an alkyl group or an aryl group. For example, R5 can be a $C_1$ to $C_8$ alkyl group.

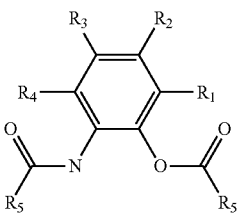

Formula VI

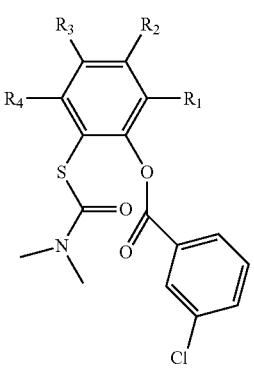

Formula VII

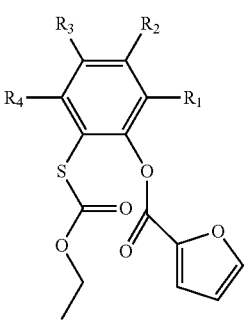

Formula VIII

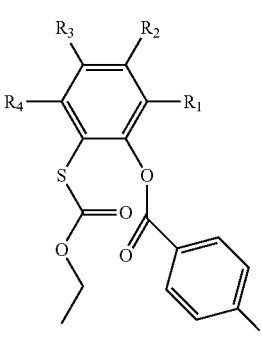

Formula IX wherein R18 is hydrogen or a hydrocarbyl group containing from about 1 to about 8 carbon atoms.

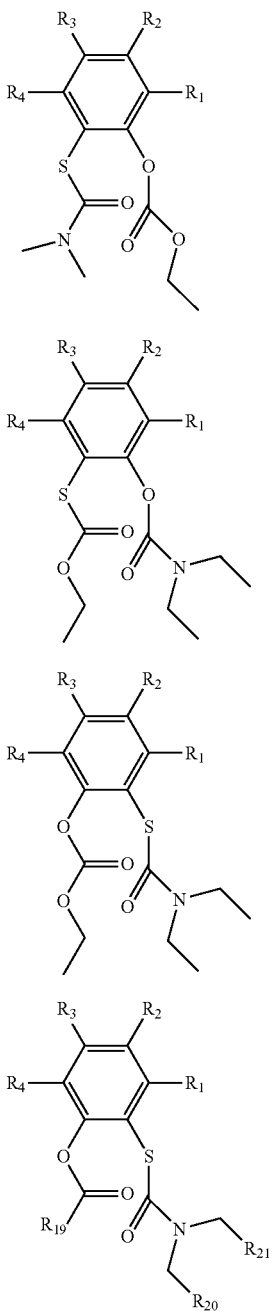

Formula X

Formula XI

Formula XII

Formula XIII wherein R19, R20 and R21 are the same or different and may be selected from a hydrocarbyl group having from about 1 to about 15 carbon atoms optionally containing a heteroatom selected from a halogen, phosphorous, sulfur, nitrogen, or oxygen. R20 and R21 can be the same or different and can be fused together to form 1 or more cyclic groups.

As described above, the procatalyst composition can include a combination of a magnesium moiety, a titanium moiety and at least one internal electron donor. The procatalyst composition is produced by way of the foregoing titanation procedure which converts the procatalyst support and the internal electron donor into the combination of the magnesium and titanium moieties, into which the internal electron donor is incorporated. In accordance with the present disclosure, a titanium extractant contacts the procatalyst during the titanation procedure and/or after the titanation procedure in order to remove titanium species that are lower in activity and that are not easily displaced by the internal electron donor. The titanium extractant removes titanium and is primarily washed out of the final product. The procatalyst support from which the procatalyst composition is formed can be the mixed magnesium/titanium precursor, the benzoate-containing magnesium chloride precursor or the spherical precursor.

In an embodiment, the magnesium moiety is a magnesium halide. In another embodiment, the magnesium halide is magnesium chloride, or magnesium chloride alcohol adduct.

In an embodiment, the titanium moiety is a titanium halide such as a titanium chloride. In another embodiment the titanium moiety is titanium tetrachloride.

In another embodiment, the procatalyst composition includes a magnesium chloride precursor upon which a titanium chloride is deposited and upon which the internal electron donor is incorporated.

The present disclosure is also directed to a catalyst system that includes the procatalyst composition as described above combined with various other catalyst components. For example, in one embodiment, the catalyst composition includes a cocatalyst. As used herein, a "cocatalyst" is a substance capable of converting the procatalyst to an active polymerization catalyst. The cocatalyst may include chlorides, alkyls, or aryls of aluminum, lithium, zinc, tin, cadmium, beryllium, magnesium, and combinations thereof. In an embodiment, the cocatalyst is a hydrocarbyl aluminum cocatalyst represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. In a further embodiment, each alkyl radical can be straight or branched chain and such hydrocarbyl radical can be a mixed radical, i.e., the radical can contain alkyl, aryl, and/or cycloalkyl groups. Nonlimiting examples of suitable radicals are: methyl, ethyl, n-propyl, isopropyl, n-butyl, isobutyl, tert-butyl, n-pentyl, neopentyl, n-hexyl, 2-methylpentyl, n-heptyl, n-octyl, isooctyl, 2-ethylhexyl, 5,5-dimethylhexyl, n-nonyl, n-decyl, isodecyl, n-undecyl, n-dodecyl.

Nonlimiting examples of suitable hydrocarbyl aluminum compounds are as follows: triisobutylaluminum, tri-n-hexylaluminum, diisobutylaluminum chloride, di-n-hexylaluminum chloride, isobutylaluminum dichloride, n-hexylaluminum dichloride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum. In an embodiment, the cocatalyst is selected from triethylaluminum, triisobutylaluminum, tri-n-hexylaluminum, diisobutylaluminum chloride, and di-n-hexylaluminum chloride.

In an embodiment, the cocatalyst is a hydrocarbyl aluminum compound represented by the formula $R_nAlX_{3-n}$ wherein n=1 or 2, R is an alkyl, and X is a halide. Nonlimiting examples of suitable compounds are as follows: diisobutylaluminum chloride, diethylaluminum chloride, ethylaluminum dichloride, methylaluminum dichloride, and dimethylaluminum chloride.

In an embodiment, the cocatalyst is triethylaluminum. The molar ratio of aluminum to titanium is from about 5:1 to about 500:1, or from about 10:1 to about 200:1, or from about 15:1 to about 150:1, or from about 20:1 to about 100:1. In another embodiment, the molar ratio of aluminum to titanium is about 45:1.

In an embodiment, the catalyst composition includes a selectivity control agent. As used herein, a "selectivity control agent" is a compound added independent of procatalyst formation and contains at least one functional group that is capable of donating a pair of electrons to a metal atom. Bounded by no particular theory, it is believed that the selectivity control agent enhances catalyst stereoselectivity, (i.e., to reduces xylene soluble material in the formant polymer).

In an embodiment, the selectivity control agent donor may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide.

In an embodiment, the selectivity control agent donor is an alkoxysilane. The alkoxysilane has the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a $C_{1-4}$ alkyl group; and m is 0, 1, 2 or 3. In an embodiment, R is $C_{6-12}$ aryl, alkyl or aralkyl, $C_{3-12}$ cycloalkyl, $C_{3-12}$ branched alkyl, or $C_{3-12}$ cyclic or acyclic amino group, R' is $C_{1-4}$ alkyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In an embodiment, the silane composition is dicyclopentyldimethoxysilane (DCPDMS), methylcyclohexyldimethoxysilane (MChDMS), or n-propyltrimethoxysilane (NPTMS), and any combination of thereof.

In an embodiment, the selectivity control agent can be a mixture of at least 2 alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane.

In an embodiment, the selectivity control agent is selected from one or more of the following: a benzoate, a succinate, and/or a diolester. In another embodiment, the selectivity control agent is a diether.

In an embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), poly(alkene glycol)ester, a diol ester, and combinations thereof. The carboxylic acid ester can be an aliphatic or aromatic, mono- or polycarboxylic acid ester. Nonlimiting examples of suitable monocarboxylic acid esters include ethyl and methyl benzoate, ethyl p-methoxybenzoate, methyl p-ethoxybenzoate, ethyl p-ethoxybenzoate, ethyl acrylate, methyl methacrylate, ethyl acetate, ethyl p-chlorobenzoate, hexyl p-aminobenzoate, isopropyl naphthenate, n-amyl toluate, ethyl cyclohexanoate, propyl pivalate, pentyl valerate and octyl acetate.

Nonlimiting examples of suitable polycarboxylic acid esters include dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, diethyl terephthalate, dioctyl terephthalate, and bis[4-(vinyloxy) butyl]terephthalate. In one embodiment, however, the catalyst composition and the catalyst system of the present disclosure are phthalate-free.

The aliphatic carboxylic acid ester may be a $C_4$-$C_{30}$ aliphatic acid ester, may be a mono- or a poly- (two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be a laurate, a myristate, a palmitate, a stearate, an oleates, a sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{30}$ aliphatic ester is isopropyl myristate or di-n-butyl sebacate.

In an embodiment, the activity limiting agent includes a diether. The diether can be a 1,3-diether compound represented by the following structure (XV):

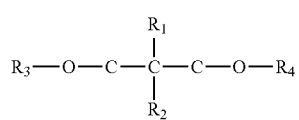

XV wherein $R_1$ to $R_4$ are independently of one another an alkyl, aryl or aralkyl group having up to 20 carbon atoms, which may optionally contain a group 14, 15, 16, or 17 heteroatom, and $R_1$ and $R_2$ may be a hydrogen atom. The dialkylether may linear or branched, and may include one or more of the following groups: alkyl, cycloaliphatic, aryl, alkylaryl or arylalkyl radicals with 1-18 carbon atoms, and hydrogen. $R_1$ and $R_2$ may be linked to form a cyclic structure, such as cyclopentadiene or fluorene.

In an embodiment, the activity limiting agent includes a succinate composition having the following structure (XVI):

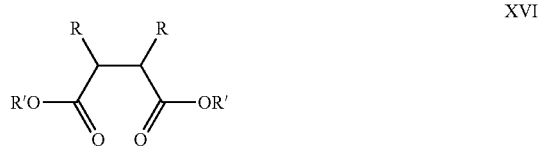

wherein R and R' may be the same or different, R and/or R' including one or more of the following groups: hydrogen, linear or branched alkyl, alkenyl, cycloalkyl, aryl, arylalkyl or alkylaryl group, optionally containing heteroatoms. One or more ring structures can be formed via one or both 2- and 3-position carbon atom.

In an embodiment, the activity limiting agent includes a diol ester as represented by the following structure (XVII):

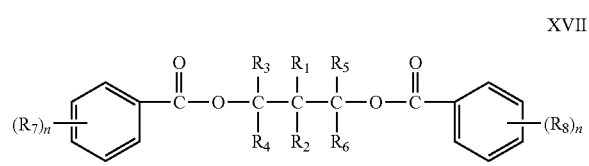

wherein n is an integer from 1 to 5. $R_1$ and $R_2$, may be the same or different, and each may be selected from hydrogen, methyl, ethyl, n-propyl, i-propyl, n-butyl, i-butyl, t-butyl, allyl, phenyl, or halophenyl group. $R_3$, $R_4$, $R_5$, $R_6$, $R_7$, and $R_8$ may be the same or different, and each may be selected from hydrogen, halogen, substituted, or unsubstituted hydrocarbyl having 1 to 20 carbon atoms. $R_1$-$R_6$ groups may optionally contain one or more heteroatoms replacing carbon, hydrogen or both, the hetero-atom selected from nitrogen, oxygen, sulfur, silicon, phosphorus and a halogen. $R_7$ and $R_8$, may be the same or different, and may be bonded to any carbon atom of the 2-, 3-, 4-, 5-, and 6-position of either phenyl ring.

In one embodiment, the catalyst system includes a mixed external electron donor. A mixed external electron donor comprises at least two of the following components: (1) a first selectivity control agent, (2) a second selectivity control agent, and (3) an activity limiting agent.

In an embodiment, the selectivity control agent and/or activity limiting agent can be added into the reactor separately. In another embodiment, the selectivity control agent and the activity limiting agent can be mixed together in advance and then added into the reactor as a mixture. In the mixture, more than one selectivity control agent or more than one activity limiting agent can be used. In an embodiment, the mixture is dicyclopentyldimethoxysilane and isopropyl myristate, dicyclopentyldimethoxysilane and poly(ethylene glycol)laurate, dicyclopentyldimethoxysilane and isopropyl myristate and poly(ethylene glycol)dioleate, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, and dicyclopentyldimethoxysilane and tetraethoxysilane and isopropyl myristate, and combinations thereof.

In an embodiment, the catalyst composition includes any of the foregoing selectivity control agents in combination with any of the foregoing activity limiting agents.

The present disclosure is also directed to a process for producing an olefin-based polymer using the catalyst composition as described above. Through the use of the titanium extractant, for instance, catalyst compositions can be produced that have increased stereoselectivity for producing polymers with lower xylene soluble content. For instance, the catalyst composition can be used to produce polyolefin polymers having reduced amorphous content or atactic content.

In general, the catalyst composition of the present disclosure can be used in any suitable polymerization process including gas-based processes or bulk processes. The process includes contacting an olefin with the catalyst composition under polymerization conditions. The process further includes forming an olefin-based polymer.

The catalyst composition can include a procatalyst composition and a cocatalyst. The catalyst composition may be any catalyst composition as disclosed herein. The procatalyst composition may include a substituted phenylene compound as the internal electron donor. The cocatalyst may be any cocatalyst as disclosed herein. The catalyst composition may optionally include a selectivity control agent and/or an activity limiting agent as previously disclosed.

The olefin-based polymer can be a propylene-based olefin, an ethylene-based olefin, and combinations thereof. In one embodiment, the olefin-based polymer is a propylene-based polymer.

One or more olefin monomers can be introduced into a polymerization reactor to react with the catalyst and to form a polymer, or a fluidized bed of polymer particles. Nonlimiting examples of suitable olefin monomers include ethylene, propylene, $C_{4-20}$ α-olefins, such as 1-butene, 1-pentene, 1-hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

As used herein, "polymerization conditions" are temperature and pressure parameters within a polymerization reactor suitable for promoting polymerization between the catalyst composition and an olefin to form the desired polymer. The polymerization process may be a gas phase, a slurry, or a bulk polymerization process, operating in one, or more than one, reactor.

Polymerization can occur by way of gas phase polymerization. As used herein, "gas phase polymerization" is the passage of an ascending fluidizing medium, the fluidizing medium containing one or more monomers, in the presence of a catalyst through a fluidized bed of polymer particles maintained in a fluidized state by the fluidizing medium or in a stirred gas medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends through the gas-phase reactor.

A typical gas-phase polymerization reactor (or gas phase reactor) includes a vessel (i.e., the reactor), the fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone. In an embodiment, the fluidizing medium includes propylene gas and at least one other gas such as an olefin and/or a carrier gas such as hydrogen or nitrogen.

The contacting can occur by way of feeding the catalyst composition into a polymerization reactor and introducing the olefin into the polymerization reactor. The cocatalyst can be mixed with the procatalyst composition (pre-mix) prior to the introduction of the procatalyst composition into the polymerization reactor. In another embodiment, the cocatalyst is added to the polymerization reactor independently of the procatalyst composition. The independent introduction of the cocatalyst into the polymerization reactor can occur simultaneously, or substantially simultaneously, with the procatalyst composition feed.

In addition to a gas-phase polymerization process, the catalyst composition of the present disclosure can also be used in a bulk-phase process. In a bulk polymerization process, the catalyst composition is contacted with one or more liquid monomers, such as liquid propylene. Hydrogen can also be contained within the reaction medium for controlling molecular weight of the resulting polymer.

In an embodiment, the polymerization process may include a pre-polymerization step. Pre-polymerization includes adding the procatalyst composition, after contacted with the co-catalyst and the selectivity control agent and/or the activity limiting agent, in an olefin polymerization step that results in a low degree of conversion of about 0.5 to about 1000 grams of polymer per gram of solid procatalyst component. The pre-polymerization step can be conducted as part of a continuous polymerization process or separately in a batch process. When conducted as part of a continuous process the conversion of the pre-polymerized catalyst component is preferably from about 50 to about 500 g polymer per gram of solid catalyst component. The pre-polymerized catalyst stream is then introduced into the main polymerization reaction zone and contacted with the remainder of the olefin monomer to be polymerized, and optionally additional quantities of one or more of the cocatalyst and selectivity control agent components. Pre-polymerization results in the procatalyst composition being combined with the cocatalyst and the selectivity control agent and/or the activity limiting agent, the combination being dispersed in a matrix of the formant polymer. Optionally, additional quantities of the cocatalyst, the selectivity control agent and/or the activity limiting agent may be added.

The polymerization process may include a pre-activation step. Pre-activation includes contacting the procatalyst composition with the co-catalyst and the selectivity control agent and/or the activity limiting agent. The resulting preactivated catalyst stream is subsequently introduced into the polymerization reaction zone and contacted with the olefin monomer to be polymerized, and optionally one or more of the selectivity control agent components. Pre-activation results in the procatalyst composition being combined with the cocatalyst and the selectivity control agent and/or the activity limiting agent. Optionally, additional quantities of the selectivity control agent and/or the activity limiting agent may be added.

In one embodiment, a polypropylene homopolymer is produced in a first reactor. The content of the first reactor is subsequently transferred to a second reactor into which ethylene is introduced. This results in production of a propylene-ethylene copolymer in the second reactor.

In an embodiment, the olefin is propylene. The process includes forming a propylene-based polymer having a melt flow rate (MFR) from about 0.01 g/10 min to about 800 g/10 min, or from about 0.1 g/10 min to about 200 g/10 min, or from about 0.5 g/10 min to about 150 g/10 min. In a further embodiment, the propylene-based polymer is a polypropylene homopolymer.

As described above, in one aspect, the catalyst composition of the present disclosure can be used to reduce the xylene soluble content of a polymer, particularly a polypropylene polymer. For instance, the resulting polypropylene polymer can have a xylene content of less than about 6% by weight, such as less than about 5% by weight, such as less than about 4% by weight, such as less than about 3% by weight, such as less than about 2% by weight, and generally greater than about 0.1% by weight.

The catalyst composition and the catalyst system of the present disclosure are also well suited for producing impact resistant polymers that have rubber-like or elastomeric properties. These polymers are typically made in a two reactor system where it is desirable for the catalyst to maintain high activity levels. In one embodiment, for instance, the polymerization is performed in two reactors connected in series. A propylene homopolymer or a propylene copolymer can be formed in the first reactor in order to form an active propylene-based polymer. The active propylene-based polymer from the first polymerization reactor is then introduced into a second polymerization reactor and contacted, under second polymerization conditions, with at least one second monomer in the second reactor to form a propylene impact copolymer. In one embodiment, the process includes contacting the active propylene-based polymer with propylene and ethylene in the second polymerization reactor under polymerization conditions and forming a discontinuous phase of propylene/ethylene copolymer.

As described above, the first phase polymer can comprise a polypropylene homopolymer. In an alternative embodiment, however, the first phase polymer may comprise a random copolymer of polypropylene.

The random copolymer, for instance, can be a copolymer of propylene and an alpha-olefin, such as ethylene. The polypropylene random copolymer forms the matrix polymer in the polypropylene composition and can contain the alpha-olefin in an amount less than about 12% by weight, such as in an amount less than about 5% by weight, such as in an amount less than about 4% by weight, and generally in an amount greater than about 0.5% by weight, such as in an amount greater than about 1% by weight, such as in an amount greater than about 1.5% by weight, such as in an amount greater than about 2% by weight. The first phase polymer can have a xylene soluble content of generally less than about 12% by weight, such as in an amount less than about 10% by weight, such as in an amount less than about 8% by weight, such as in an amount less than about 6% by weight, such as in an amount less than about 4% by weight. The xylene soluble content is generally greater than about 0.5% by weight, such as greater than about 3% by weight.

The first phase polymer can have a relatively broad molecular weight distribution. For instance, the molecular weight distribution (Mw/Mn) greater than about 3.8, such as greater than about 4, such as greater than about 4.3, such as greater than about 4.5, such as greater than about 4.8, such as greater than about 5, such as greater than about 5.2, such as greater than about 5.5, such as greater than about 5.7, such as greater than about 6, and generally less than about 9, such as less than about 8.5, such as less than about 8. The weight average molecular weight (determined by GPC) of the first phase polymer is generally greater than about 100,000, such as greater than about 120,000.

The polypropylene random copolymer or polypropylene homopolymer that makes up the first phase polymer, in one embodiment, has a relatively high melt flow rate. For instance, the first phase polymer can have a melt flow rate of greater than about 5 g/10 mins, such as greater than about 10 g/10 mins, such as greater than about 15 g/10 mins, such as greater than about 20 g/10 mins, such as greater than about 25 g/10 mins. The melt flow rate of the first phase polymer is generally less than about 1000 g/10 mins, such as less than about 500 g/10 mins.

The second phase polymer is a propylene and alpha-olefin copolymer. The second phase polymer, however, has elastomeric or rubber-like properties. Thus, the second phase polymer can dramatically improve the impact strength resistance of the polymer.

The second phase polymer which forms a dispersed phase within the polymer composition contains the alpha-olefin or ethylene in an amount generally greater than about 10% by weight, such as in an amount greater than about 12% by weight, such as in an amount greater than about 14% by weight and generally less than about 35% by weight, such as less than about 20% by weight, such as in an amount less than about 17% by weight. The second phase polymer can have a weight average molecular weight of at least about 130,000, such as at least about 140,000, such as at least about 150,000 and generally less than about 500,000.

The present disclosure may be better understood with reference to the following examples.

General Procedures

Homopolymerization at 70° C. A 2 L stainless steel autoclave equipped with overhead stirrer and thermostating jacket was purged with argon at 90° C. for one hour before cooling to 20° C. and exchanging the argon with propylene gas. A cocatalyst solution was prepared by mixing 2.3 mmole of triethylaluminum and 0.078 mmole of dicyclopentyldimethoxysilane in 15 ml of hexane. 6 ml of the cocatalyst solution was added to charging tube A. The remainder was added to charging tube B with approximately 3 mg of solid catalyst. Hydrogen (57 mmole) was added to the reactor and contents of charging tube A was flushed into the reactor with 600 ml of propylene. Stirring was initiated and the contents of charging tube B was flushed into the reactor with 450 ml of propylene. The reactor was heated to 70° C. in 10 minutes and polymerization continued for 1 h. At the end of the polymerization the stirrer was turned off and non-reacted propylene vented while cooling the reactor. The polymer was recovered and dried in a vacuum oven at 50° C. before weighing and analysis.

In cases where polymerizations were conducted in a 4 L autoclave the same general procedure was followed except charging tubes A & B were charged with 1400 ml and 600 ml of propylene. Reagent amounts in 4 L polymerizations were: 2.0 L of propylene, 252 mmole hydrogen, 3.4 mmole of triethylaluminum, 0.131 mmole of dicyclopentyldimethoxysilane, and 8.0 mg of catalyst.

Melt flow rate was measured in accordance with ASTM D 1238-01 test method at 230° C. with a 2.16 kg weight for propylene-based polymers. Xylene Solubles (XS) was measured using a Crystex automated instrument by Polymer Char. The Crystex was calibrated with polypropylene homopolymer samples analyzed for XS by ASTM D 5492-10 test method.

A MgCl$_2$*EtOH adduct was prepared as described previously in U.S. Pat. No. 5,468,698. MgCl$_2$*EtOH adduct with average particle size of 58 micron and EtOH/Mg mole ratio of 2.2 was used for catalysts E-12, E-13, C-6, and C-7. Examples C8, E14 and E115 were prepared with MgCl$_2$*EtOH containing EtOH/MgCl$_2$ mole ratio 3.2.

Internal donor structures for the examples are given in Table 1.

TABLE 1

Internal Donor Structures

| Donor Designation | Chemical Name | Structure |
|---|---|---|
| ID-1 | 4-(cyclohexyl)-3,6-dimethyl-1,2-phenylene dibenzoate | |
| ID-2 | 4-(3-pentyl)-3,6-dimethyl-1,2-phenylene dibenzoate | |
| ID-3 | 5-(t-butyl)-3-methyl 1,2 phenylene dibenzoate | |
| ID-4 | 4-(cycloheptyl)-3,6-dimethyl-1,2-phenylene dibenzoate | |
| ID-5 | 4-(o-toly)-3,6-dimethyl-1,2-phenylene dibenzoate | |

Examples 1-3, Ethyl Benzoate as Secondary Donor 4.0 g of a MagTi support (U.S. Pat. Nos. 5,124,298 and 5,962,361) is added to a 100 ml Schlenk flask and slurried with 20 ml monochloro benzene (MCB). The slurry is transferred to a reactor under pure $N_2$. Another 20 ml of MOB is added to the support flask and used to rinse any remaining support into the reactor and the slurry is chilled to 12° C. Then 40 ml (70 g) of $TiCl_4$ that had been cooled to 10° C. is quickly added to the reactor. The slurry is heated to 25° C. and stirred at this temperature for 5 min.

2.37 (±0.03) mmole of either the donors ID-1, ID-2, or ID-3 dissolved in 7 ml of o-chlorotoluene (OCT) is added to the reactor. The temperature is then ramped to 100° C. (in 40 min), and held there for 50 min. The stirring is stopped and the slurry is allowed to settle while maintaining the reactor at 100° C. The supernatant is decanted followed by the addition of 80 mls of a 50:50 volume mixture of $TiCl_4$ and MCB that was preheated to 100° C. The reactor is heated to 115° C. During the heat-up, 0.17 ml of ethyl benzoate (1.18 mmole) dissolved in 2 ml of OCT is added. The reaction mixture is held at 115° C. for 25 min.

The stirring is stopped and the slurry is allowed to settle while maintaining the reactor at 115° C. The supernatant is decanted followed by the addition of 80 mls of a 50:50 volume mixture of $TiCl_4$ and MCB that was preheated to 100° C. The reactor is reheated to 115° C. and held at this temperature for 25 min. The stirring is stopped and the slurry is allowed to settle while maintaining the reactor at 115° C. The supernatant is decanted.

The reactor temperature is set to 25° C. Then 100 ml of heptane is added and stirred for 10 min before settling and decanting the wash. This is repeated 4 more times as the reactor cools with the last two washes being done with the reactor at 25° C. The wet solid is dried under vacuum for 2 hrs at 40° C. 2.8 g to 2.9 g of the catalyst is collected. The catalyst composition data and the polymerization results are in Table 2.

Examples 4 and 5

4.0 g of a MagTi support is added to a 100 ml Schlenk flask and slurried with 20 ml monochloro benzene (MCB). The slurry is transferred to a reactor under pure $N_2$ at room temperature. Another 20 ml of MCB is added to the support flask and used to rinse any remaining support into the reactor. Then 40 ml (70 g) of $TiCl_4$ that was either at room temperature or had been cooled to 10° C. is quickly added to the reactor. The slurry is heated to 25° C. and stirred at this temperature for 5 min.

Then 2.35 (±0.02) mmole of either the ID-1 or ID-2 donor dissolved in 7 ml of o-chlorotoluene (OCT) is added to the reactor. The temperature is then ramped to 100° C. (in 40 min), and held there for 50 min. The stirring is stopped and the slurry is allowed to settle while maintaining the reactor at 100° C. The supernatant is decanted followed by the addition of 80 mls of a 50:50 volume mixture of $TiCl_4$ and MCB. The reactor is heated to 115° C. During the heat-up, 1.18 mmole of either the ID-1 or ID-2 donor dissolved in 3.5 ml of OCT is added. The reaction mixture is held at 115° C. for 25 min.

The stirring is stopped and the slurry is allowed to settle while maintaining the reactor at 115° C. The supernatant is decanted followed by the addition of 80 mls of a 50:50 volume mixture of $TiCl_4$ and MCB. The reactor is reheated to 115° C. and held at this temperature for 25 min. The stirring is stopped and the slurry is allowed to settle while maintaining the reactor at 115° C. The supernatant is decanted.

The reactor temperature is set to 25° C. Then 100 ml of heptane is added and stirred for 10 min before settling and decanting the wash. This is repeated 4 more times as the reactor cools with the last two washes being done with the reactor at 25° C. The wet solid is dried under vacuum for 2 hrs at 40° C. 2.9 g to 3.0 g of the catalyst is collected. The catalyst composition data and the polymerization results are in Table 3.

Example 6

4.0 g of a MagTi support is added to a 100 ml Schlenk flask and slurried with 20 ml monochloro benzene (MCB). The slurry is transferred to a reactor under pure $N_2$ at room temperature. Another 20 ml of MCB is added to the support flask and used to rinse any remaining support into the reactor. Then 40 ml (70 g) of $TiCl_4$ that was either at room temperature or had been cooled to 10° C. is quickly added to the reactor. The slurry is heated to 25° C. and stirred at this temperature for 5 min.

Then 3.55 mmole of the ID-3 donor dissolved in 5.1 ml of o-chlorotoluene (OCT) is added to the reactor. The temperature is then ramped to 100° C. (in 40 min), and held there for 50 min. The stirring is stopped and the slurry is allowed to settle while maintaining the reactor at 100° C. The supernatant is decanted followed by the addition of 80 mls of a 50:50 volume mixture of $TiCl_4$ and MCB. The reactor is heated to 115° C. During the heat-up, 1.60 mmole of the A0 donor dissolved in 2.3 ml of OCT is added. The reaction mixture is held at 115° C. for 25 min.

The stirring is stopped and the slurry is allowed to settle while maintaining the reactor at 115° C. The supernatant is decanted followed by the addition of 80 mls of a 50:50 volume mixture of $TiCl_4$ and MCB. The reactor is reheated to 115° C. and held at this temperature for 25 min. The stirring is stopped and the slurry is allowed to settle while maintaining the reactor at 115° C. The supernatant is decanted.

The reactor temperature is set to 25° C. Then 100 ml of heptane is added and stirred for 10 min before settling and decanting the wash. This is repeated 4 more times as the reactor cools with the last two washes being done with the reactor at 25° C. The wet solid is dried under vacuum for 2 hrs at 40° C. 2.9 g to 3.0 g of the catalyst is collected. The catalyst composition data and the polymerization results are in Table 3.

Examples 7 and 8

The procedure for Examples 4 and 5 was followed except that no donor was added in the second titanation. The catalyst composition data and the polymerization results are in Table 3.

TABLE 2

Examples 1-3

| Example | 1st Titanation mmole, ID | 2nd Titanation mmole, ID | % Ti | % ID | % EB | Activity, kg/g | MFR | XS |
|---|---|---|---|---|---|---|---|---|
| E-1 | 2.37 mmole ID-1 | 1.18 mmole EB[1] | 3.4 | 21.3 | 1.24 | 67 | 7 | 1.61 |
| E-2 | 2.37 mmole ID-2 | 1.18 mmole EB[1] | 3.8 | 25.5 | 0.82 | 94 | 6 | 0.91 |
| E-3 | 2.37 mmole ID-3 | 1.18 mmole EB[1] | 3.4 | 17.9 | 2.7 | 67 | 2 | 1.18 |

[1]ethyl benzoate

TABLE 3

Examples 4-8

| Example | 1st Titanation mmole, ID | 2nd Titanation mmole, ID | % Ti | % ID | % EB | Activity, kg/g | MFR | XS |
|---|---|---|---|---|---|---|---|---|
| E-4 | 2.35 mmole ID-1 | 1.18 mmole ID-1 | 3.3 | 23.8 | 0.23 | 64 | 10 | 1.34 |
| E-5 | 2.35 mmole ID-2 | 1.18 mmole ID-2 | 3.7 | 30.6 | 0.10 | 89 | 6 | 0.64 |
| E-6 | 3.55 mmole ID-3 | 1.60 mmole ID-3 | 3.3 | 15.5 | 2.4 | 75 | 4 | 1.37 |
| E-7 | 2.35 mmole ID-1 | none | 5.3 | 20.8 | 0.51 | 35 | 10 | 3.51 |
| E-8 | 2.35 mmole ID-2 | none | 4.5 | 29.4 | nd | 67 | 5 | 1.50 |

The above data shows that leaving out the donor in the second titanation gives a catalyst with higher Ti, lower activity, and higher XS. Surprisingly, the amount of the donor incorporated into the catalyst remained about the same as when the full charge of donor was used.

Not being constrained by any particular hypothesis, it appears that the function of the donor in the second titanation is to help extract titanium species that were lower in activity and worse in steroregulating ability than the species left after the second titanation with the higher amounts of donor.

Examples 9 Through 16

In the following examples the procedure used for Examples 1-3 was followed with the exception that the donors and their amounts used in the first and second titanations were as listed in Table 4. The composition and polymerization results are also shown in Table 4.

| Example | 1st Titanation mmole, ID | 2nd Titanation mmole, ID | % Ti | % ID | % second donor | Activity, kg/g | MFR | XS |
|---|---|---|---|---|---|---|---|---|
| E-9 | 2.37 mmole ID-1 | 2.36 mmole EB[1] | 3.3 | 17.1 | 1.4 | 72 | 8 | 1.06 |
| E-10 | 2.37 mmole ID-2 | 2.36 mmole EB[1] | 3.6 | 23.3 | 1.3 | 108 | 6 | 1.11 |
| E-11 | 2.33 mmole ID-1 | 1.16 mmole PV[2] | 3.4 | 21.3 | 0.4 | 62 | 10 | 2.1 |
| E-12 | 2.40 mmole ID-2 | 1.16 mmole PV[2] | 3.8 | 27.2 | nd | 106 | 6 | 1.36 |
| E-13 | 2.37 mmole ID-3 | 1.16 mmole PV[2] | 3.6 | 18.1 | 0.4 | 73 | 1 | 0.90 |
| E-14 | 2.40 mmole ID-2 | 2.40 mmole EA[3] | 3.7 | 20.5 | 1.4 | 100 | 4 | 1.44 |
| E-15 | 2.40 mmole ID-2 | 2.40 mmole AP[4] | 3.9 | 23.1 | 0.6 | 86 | 2 | 1.29 |

-continued

| Example | Donor and extractant charges | | % Ti | % ID | % second donor | Activity, kg/g | MFR | XS |
| --- | --- | --- | --- | --- | --- | --- | --- | --- |
| | 1st Titanation mmole, ID | 2$^{nd}$ Titanation mmole, ID | | | | | | |
| E-16 | 2.40 mmole ID-2 | 2.40 mmole DEC[5] | 3.2 | 20.5 | 0.7 | 103 | 2 | 0.82 |

[1]ethyl benzoate
[2]pentyl valerate
[3]ethyl anisate
[4]acetophenone
[5]diethyl carbonate

Example 17 Through 19

20 g of MgCl$_2$*EtOH precursor and 73 ml of heptane were added to a 1 L jacketed glass reactor with overhead stirring and the mixture was cooled to −20° C. 350 g of TiCl4 pre-cooled to −20° C. was added and stirring continued for 1 h. The reactor temperature was increased to 20° C. at a rate of 0.33° C./min. A solution of 1.5 g of ethyl benzoate in 5 ml of heptane was added by cannual. After completing the addition, the reactor temperature was increased to 85° C. at a rate of 0.54° C./min. During the temperature ramp a solution of 1.8 g of internal donor in 30 ml of toluene was metered at a rate of 0.4 mL/min. After reaching 85° C., stirring was continued for 1 h before allowing catalyst solids to settle and decanting the supernatant. 70 g of pre-heated TiCl$_4$ and 140 g of toluene were added, followed by 1.2 g of internal donor in 10 ml of toluene, and the mixture was stirred at 105° C. for 1 h before repeating the settle and decant steps. The TiCl$_4$/toluene treatment was repeated at 120° C. for 1 h. After settle and decant the reactor was cooled to 65° C. Catalyst solids were washed five times with heptane at 65° C., 200 ml each wash. The catalyst was then dried under vacuum at 40° C. for 4 h. Catalyst composition, internal donor type, and bulk polymerization test data are listed in Table 5.

Example 20

20 g of MgCl$_2$*EtOH precursor and 73 ml of heptane were added to a 1 L jacketed glass reactor with overhead stirring and the mixture was cooled to −20° C. 350 g of TiCl$_4$ pre-cooled to −20° C. was added and stirring continued for 1 h. The reactor temperature was increased to 20° C. at a rate of 0.33° C./min and stirred for 15 minutes. The reactor temperature was increased to 85° C. at a rate of 0.54° C./min and a solution of 2.0 g of ID-1 in 30 ml of toluene was metered at a rate of 0.4 mL/min during the heat up. After reaching 85° C., stirring was continued for 1 h before allowing catalyst solids to settle and decanting the supernatant. 70 g of pre-heated TiCl$_4$ and 140 g of toluene were added, followed by 1.5 g of ethyl benzoate in 7 ml of heptane, and the mixture was stirred at 105° C. for 1 h before repeating the settle and decant steps. The TiCl$_4$/toluene treatment was repeated at 120° C. for 1 h. After settle and decant the reactor was cooled to 65° C. Catalyst solids were washed five times with heptane at 65° C., 200 ml each wash. The catalyst was then dried under vacuum at 40° C. for 4 h. Catalyst composition and bulk polymerization test data are listed in Table 5.

Example 21

The E-17 procedure was followed except the ethyl benzoate addition step was omitted. Catalyst composition and bulk polymerization test data are listed in Table 5.

Example 22

20 g of MgCl$_2$*EtOH precursor and 73 ml of heptane were added to a 1 L jacketed glass reactor with overhead stirring and the mixture was cooled to −20° C. 350 g of TiCl$_4$ pre-cooled to −20° C. was added and stirring continued for 1 h. The reactor temperature was increased to 20° C. at a rate of 0.33° C./min. A solution of 2.4 g of ethyl benzoate in 10 ml of heptane was added by cannula and stirred for 15 min. The reactor temperature was increased to 85° C. at a rate of 0.54° C./min and stirring continued for 1 h before allowing catalyst solids to settle and decanting the supernatant. 70 g of pre-heated TiCl$_4$ and 140 g of toluene were added, followed by 0.9 g of ethyl benzoate in 5 ml of heptane, and the mixture was stirred at 105° C. for 1 h before repeating the settle and decant steps. The TiCl$_4$/toluene treatment was repeated at 120° C. for 1 h. After settle and decant the reactor was cooled to 65° C. Catalyst solids were washed five times with heptane at 65° C., 200 ml each wash. The catalyst was then dried under vacuum at 40° C. for 4 h. Catalyst composition and bulk polymerization test data are listed in Table 5.

TABLE 5

Examples 17-22

| Example | 1st Titanation mmole, ID | 2$^{nd}$ Titanation mmole, ID | % Ti | % ID | % EB | Activity, kg/g | MFR | XS |
|---|---|---|---|---|---|---|---|---|
| | Donor and extractant charges | | | | | | | |
| E-17 | 10.0 mmole EB, 4.2 mmole ID-1 | 2.8 mmole ID-1 | 2.83 | 15.6 | 3.4 | 52 | 20 | 1.73 |
| E-18 | 10.0 mmole EB, 4.1 mmole ID-4 | 2.7 mmole ID-4 | 2.96 | 21.1 | 3.8 | 66 | 15 | 1.72 |
| E-19 | 10.0 mmole EB, 4.3 mmole ID-5 | 2.8 mmole ID-5 | 3.05 | 15.7 | 3.7 | 62 | 13 | 1.63 |
| E-20 | 4.7 mmole ID-1 | 10.0 mmole EB | 2.56 | 11.4 | 6.2 | 55 | 21 | 1.76 |
| E-21 | 4.2 mmole ID-1 | 2.8 mmole ID-1 | 5.26 | 15.5 | 0.8 | 46 | 19 | 4.8 |
| E-22 | 16.0 mmole EB | 6.0 mmole EB | 2.54 | 0 | 13.0 | 23 | 40 | 6.6 |

Polymerization were conducted in a 4L autoclave.

Examples E-23-E-25 demonstrate preparation and behavior of catalysts prepared with MgCl$_2$*3.2EtOH as a support and 1,8-Naphthalene dibenzoate as an internal donor.

TABLE 6

Catalyst composition and catalyst properties

| Example | Comments | D50, □ | SPAN | Ti, % | Mg,% | Donor, % | CE, kg/g | XS, % (wet) | BD, g/cm3 | MF, g/10 min | D50, □ | SPAN |
|---|---|---|---|---|---|---|---|---|---|---|---|---|
| E-23 | No EB | 46.8 | 0.858 | 4.55 | 15.59 | 14.0 | 48.2 | 9.29 | 0.368 | 3.8 | 2567 | 0.449 |
| E-24 | EB | 54.0 | 0.690 | 3.57 | 21.18 | 13.3 | 74.3 | 3.25 | 0.377 | 0.83 | 2627 | 0.542 |
| E-25 | EB | 47.8 | 1.051 | 3.05 | 16.67 | 12.6 | 73.6 | 3.68 | 0.414 | 0.6 | 1913 | 0.877 |

Example 23

The experiment was conducted using MgCl$_2$*EtOH support and 1,8-Naphthalene dibenzoate without ethyl benzoate. The catalyst demonstrates a moderate activity (48.2 kg/g) and very high XS level (9.29%).

A reactor (1) was charged with MgCl$_2$*EtOH (16.3 g), heptane (68 g) and cooled down to −25° C. A reactor (2) was charged with TiCl$_4$ (207 g) of TiCl$_4$ and cooled down to −23° C. The slurry of the support from reactor (1) was transferred to reactor (2) keeping internal temperature at −20° C. and agitation speed at 400 rpm. The reaction mixture was held for 1 hour. The reactor temperature was raised from −20° C. to 20° C. in 2 hours and from 20° C. to 85° C. in 3 hours, held for 1 hour at 85° C. and filtered. The solid was washed with toluene (130 ml) 2 times and then add toluene was added (130 ml). The reactor was heated to 105° C. 1,8-Naphthalene dibenzoate (1.0 g) was added at 80° C. The reaction mixture was agitated for 1 hour at 105° C. After flirtation the solid part was treated with 10% (w) of TiCl$_4$/toluene 4 times at 105 and 110° C.

Example 24

Example E-23 was repeated except 2.0 g of ethyl benzoate was added after completion of TiCl$_4$ addition at 20° C. The example demonstrates the effect of ethyl benzoate on the catalyst performance. The catalyst activity dramatically increased to 74.6 kg/g and XS level reduced to 3.25%

Example 25

Example E-24 was repeated except TiCl$_4$ was added to the MgCl$_2$*EtOH. The example demonstrates a different method of the titanation with the presence of ethyl benzoate. The catalyst demonstrates high activity (47.8 kg/g) and good XS level (3.68%).

To understand the effect on the catalyst performance, the FTIR study of the catalysts was conducted.

The IR spectrum of the catalysts prepared with 1,8-Naphthalene dibenzoate and with and without ethyl benzoate are presented in FIGS. 1 and 2. The FTIR spectrums are different. Both catalysts contain 1,8-Naphthalene dibenzoate complexes with MgCl$_2$ with slightly different coordination (□-C=O bands at 1702 cm$^{-1}$ and 1698 cm$^{-1}$ correspondently). The catalyst made with ethyl benzoate from examples E-23 shows bands of ethyl benzoate complexes with MgCl$_2$ (1669 cm$^{-1}$ region) and complexes with TiCl$_4$ (1640 cm$^{-1}$ region).

FTIR data support a difference of the catalyst behavior in polymerization process.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A process for producing a Ziegler-Natta procatalyst composition comprising: subjecting a procatalyst comprising magnesium to at least a first titanation step and a second titanation step; incorporating an internal electron donor into the procatalyst during the first titanation step; and contacting the procatalyst with a titanium extractant during the second titanation step or after the titanation steps, the titanium extractant removing titanium on the procatalyst, wherein the internal electron donor comprises an aryl diester, and wherein the titanium extractant comprises a monoester, a ketone, a carbonate, or mixtures thereof.

2. The process of claim 1, wherein the titanium extractant comprises a monoester.

3. The process of claim 1, wherein the titanium extractant comprises an alkyl benzoate.

4. The process of claim 1, wherein the aryl diester comprises a naphthyl dibenzoate having the following formula:

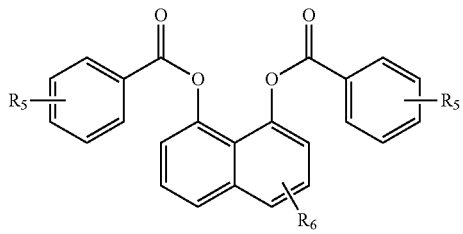

wherein:
each $R^5$ and $R^6$ is independently hydrogen, halogen, alkyl having 1 to about 8 carbon atoms, phenyl, arylalkyl having 7 to about 18 carbon atoms, or alkylaryl having 7 to about 18 carbon atoms.

5. The process of claim 1, wherein the procatalyst is contacted with the titanium extractant during the first titanation step.

6. The process of claim 1, wherein the procatalyst is contacted with the titanium extractant during the second titanation step.

7. The process of claim 1, wherein during the first titanium step, the procatalyst is contacted with the internal electron donor in the absence of the titanium extractant and wherein during the second titanation step, the procatalyst is contacted with the titanium extractant in the absence of the internal electron donor.

8. The process of claim 1, wherein during the first titanation step, the procatalyst is contacted with the internal electron donor and the titanium extractant and wherein during the second titanation step, the procatalyst is contacted with the titanium extractant, or both the internal electron donor and the titanium extractant.

9. The process of claim 1, wherein the procatalyst comprises a spray crystallized magnesium halide compound.

10. The process of claim 9, wherein the spray crystallized magnesium halide compound comprises ethanol and magnesium chloride in a weight ratio of from about 1.5:1 to about 3.1:1.

11. The process of claim 1, wherein the aryl diester is represented as:

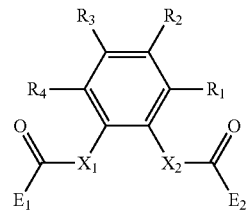

wherein:
$R_1$ and $R_4$ are each hydrogen or a hydrocarbyl group having from 1 to 20 carbon atoms; and
at least one of $R_2$ and $R_3$ is hydrogen; and
at least one of $R_2$ and $R_3$ comprises a substituted or unsubstituted hydrocarbyl group having from 1 to 20 carbon atoms;
$E_1$ and $E_2$ are the same or different and selected from the group consisting of an alkyl having 1 to 20 carbon atoms, a substituted alkyl having 1 to 20 carbon atoms, an aryl having 6 to 20 carbon atoms, a substituted aryl having 6 to 20 carbon atoms, or an inert functional group having 1 to 20 carbon atoms and optionally containing heteroatoms;
$X_1$ and $X_2$ are each O, S, an alkyl group or $NR_5$ and wherein $R_5$ is a hydrocarbyl group having 1 to 20 carbon atoms or is hydrogen.

12. The process of claim 11, wherein at least one of $R_2$ and $R_3$ comprises a hydrocarbyl group having a branched or linear structure or comprising a cycloalkyl group having from 5 to 15 carbon atoms.

13. The process of claim 1, wherein the procatalyst comprises a magnesium moiety having the following formula:

$$Mg(OR)_nX_{2-n}L_m$$

wherein:
R comprises an alkyl or aryl group containing a halogen atom;
n is 0 to 2;
L comprises coordinated ligand groups of ethers and/or alcohols;
m is from 0 to 10; and
a titanium moiety represented by the following formula:

$$Ti(OR')_gX_{4-g}$$

wherein each R' is independently a $C_1$-$C_4$ alkyl group; X is bromine, chlorine or iodine; and g is 0, 1, 2 or 3.

14. A catalyst composition comprising:
the procatalyst composition produced by the process of claim 13;
a cocatalyst; and
optionally, a selectivity control agent.

15. The catalyst composition of claim 14, wherein the cocatalyst comprises triethylaluminum.

16. The catalyst composition of claim 14, wherein the selectivity control agent is present and comprises an alkoxysilane.

17. The catalyst composition of claim 14, wherein the selectivity control agent comprises dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, dimethyldimethoxysilane or mixtures thereof.

18. The catalyst composition of claim 14, wherein the catalyst composition further comprises an activity limiting agent.

19. A process for producing a polyolefin polymer comprising: polymerizing a propylene monomer and optionally one or more comonomers in the presence of a catalyst composition as defined in claim 14.

20. A process as defined in claim 19, wherein the process produces a polypropylene polymer having a xylene solubles content of from about 0.5% to about 6% by weight.

* * * * *